United States Patent

Berhorst et al.

(10) Patent No.: US 7,084,640 B2
(45) Date of Patent: Aug. 1, 2006

(54) OPERATING AND EVALUATION CIRCUIT OF AN INSECT SENSOR

(75) Inventors: Martin Berhorst, Heilbronn (DE); Peter Schneider, Hassmersheim (DE)

(73) Assignee: ATMEL Germany GmbH, Heilbronn (DE)

( * ) Notice: Subject to any disclaimer, the term of this patent is extended or adjusted under 35 U.S.C. 154(b) by 0 days.

(21) Appl. No.: 11/100,401

(22) Filed: Apr. 7, 2005

(65) Prior Publication Data

US 2005/0225331 A1 Oct. 13, 2005

(30) Foreign Application Priority Data

Apr. 8, 2004 (DE) ............ 10 2004 018 422

(51) Int. Cl.
*G01R 27/02* (2006.01)
*G08B 23/00* (2006.01)

(52) U.S. Cl. ............... 324/611; 340/573.1; 340/573.2
(58) Field of Classification Search ........... 324/611
See application file for complete search history.

(56) References Cited

U.S. PATENT DOCUMENTS

| | | | |
|---|---|---|---|
| 3,898,472 A * | 8/1975 | Long ................ | 180/270 |
| 4,398,145 A | 8/1983 | Quayle et al. | |
| 5,831,466 A * | 11/1998 | Pulvirenti et al. ....... | 327/309 |
| 5,980,106 A * | 11/1999 | Yamamoto et al. ...... | 374/178 |
| 6,100,805 A | 8/2000 | Lake | |
| 6,150,944 A | 11/2000 | Martin et al. | |
| 6,166,641 A | 12/2000 | Oguchi et al. | |
| 6,304,185 B1 | 10/2001 | Tuttle et al. | |
| 2003/0001745 A1 | 1/2003 | Barber et al. | |
| 2004/0062292 A1* | 4/2004 | Pennock ................. | 374/170 |

* cited by examiner

*Primary Examiner*—Vincent Q. Nguyen
*Assistant Examiner*—John Zhu
(74) *Attorney, Agent, or Firm*—McGrath, Geissler, Olds & Richardson, PLLC

(57) ABSTRACT

An operating and evaluation circuit of an insect sensor is provided, which has a resistor that is dependent on insect infestation, whereby the circuit during stimulation via a transponder generates a current flow through the resistor, detects a change in the resistor as a change in voltage, and compares it with a predetermined threshold. The circuit includes a transponder-stimulated constant current source, which is connected with the resistor so that a constant voltage drops across the resistor.

13 Claims, 3 Drawing Sheets

OPERATING AND EVALUATION CIRCUIT OF AN INSECT SENSOR

This nonprovisional application claims priority under 35 U.S.C. § 119(a) on German Patent Application No. DE 102004018422.4, which was filed in Germany on Apr. 8, 2004, and which is herein incorporated by reference.

BACKGROUND OF THE INVENTION

1. Field of the Invention

The present invention relates to an operating and evaluation circuit of an insect sensor, which includes a resistor that is dependent on insect infestation, whereby the circuit, upon stimulation via a transponder, generates a current flow through the resistor, detects a change in the resistor as a change in voltage, and compares it with a predetermined threshold.

2. Description of the Background Art

In some parts of the world, there is an increased risk of damage to buildings due to the eating of wood by termites living underground. Wooden structures in the USA, Australia, and New Zealand, but also in southern Europe are particularly affected by this. RFID tags (RFID=radio frequency identification) with external resistor paper strips are buried in soil to determine whether a certain area is threatened by such species. Attracted by the bait-impregnated strips, the possibly present termites attack the resistor paper strip and consume it gradually so that its electrical resistance increases. If a reader is brought sufficiently close to the sensor, it supplies the sensor with energy for a resistance measurement according to a transponder principle. Resistance values lying above a threshold are signaled to the reader by the operating and evaluation circuit and indicate insect infestation, particularly termite infestation.

Conventional operating and evaluation circuits typically use a voltage divider with the RFID resistor and another resistor. A center tap of the voltage divider controls a transistor whose working current path lies between an earth potential and a terminal, at which a reader generates a supply potential via the transponder. A collector terminal of the transistor in the current-free state is pulled to the ground potential via a pull-down resistor.

In the undamaged state without insect infestation, the RFID resistor strip has a relatively small resistance, so that with a build up in the supply potential via the transistor most of the voltage applied at the voltage divider declines across the other resistor. There is only a small potential then at the center tap, which is not sufficient to control the transistor conductively. The working current path is therefore virtually current-less, so that the sensor potential corresponds approximately to the ground potential because of the pull-down resistor.

With insect infestation, the resistance of the RFID resistor strip increases. As a result, at the center tap of the voltage divider an increased voltage occurs, which controls the transistor conductively, which enables a current over its working current line and thereby a voltage drop across the pull-down resistor. The voltage drop is detected by a threshold detector and a value exceeding the threshold is signaled to the reader via the transponder connection.

In the conventional circuit, the additional resistor, transistor, and a resonance capacitor of the transponder are disposed outside the transponder housing on a board of the insect sensor. A current of 4 to 10 mA must be provided to achieve an open base-emitter voltage of about 0.7 V in the transistor to supply the external components in the conventional circuit and at resistance values of the resistor strip between 15 kΩ in the new state and about 100 kΩ for the so-called trip point, which characterizes insect infestation. Because this current must be induced via the transponder, the high current requirement goes hand in hand with a high damping of the input resonant circuit of the circuit, which interferes with the reader range. The high current requirement therefore reduces the distance up to which stimulation and reading of the circuit with a transponder-reader is possible.

SUMMARY OF THE INVENTION

It is therefore an object of the present invention to provide an operating and evaluation circuit for an insect sensor that avoids these disadvantages and increases the reading range, particularly with the radiated energy from the reader.

This object is attained in an example embodiment of the present invention with an operating and evaluation circuit of the aforementioned type in that the circuit has a constant voltage source that can be stimulated via the transponder and is connected with the resistor so that there is a constant voltage across the resistor.

These features provide an energy-saving interrogation of the insect sensor, which increases functional reliability and reader range. The constant voltage source that can be stimulated, generates the same voltage drop across the resistor regardless of the resistance value. A relatively small measuring voltage of $U\_mess=20$ mV, stimulated by the transponder, at the trip point of the resistor strip (100 kΩ), generates a current of 200 nA. At a constant measuring voltage, this current is determined solely by the paper strip resistance value. It turned out that this measuring voltage is thus sufficient to enable differentiation between resistor strips not infested with insects and insect-infested sensors. Because this measuring voltage can be substantially smaller than the 0.7 V required in the conventional art for controlling the transistor, the solution of the invention manages with less energy. Because the energy is supplied via a transponder, an increase in the reading range is associated with this decline in the energy requirement.

The invention, also makes it possible to avoid using components outside the circuit for evaluating the resistance. This is related to cost saving in the assembly of the insect sensor.

In a further example embodiment, the circuit has a current source, which is controlled by the constant voltage source and generates a current dependent on the current flow through the resistor.

This embodiment provides a current intensity that depends on the resistance value to a certain extent as a replacement parameter for the current flowing through the resistor.

Another example embodiment includes a second current source and a node, whereby the second current source is in series with the controlled current source between a first supply potential and a second supply potential and whereby the node adds the current flows of the second current source and the controlled current source.

By adding the two currents at the node, the potential of the node is pulled toward one of the two supply potentials, when one of the two currents dominates.

As a result, this generates a variable signal, which depends on the value of the sensor resistance, between the two supply potentials. The variable signal allows the detection of a value exceeding the resistance threshold, without creating a triggering level directly by a current flowing across the resistor, as occurs in the conventional art. Overall, within the scope of this example embodiment, a smaller voltage drop of about 20 mV at the measuring resistor is sufficient to thereby generate a digital high-low signal from the resistance response of the measuring resistor.

In a further example embodiment, a comparing element is provided that can compare a potential, which occurs at the node as a function of the current flows, with a predetermined threshold and generates an output signal change when the threshold is passed.

This type of threshold comparison allows reliable checking of the measuring resistor for insect infestation.

Furthermore, the constant voltage source can have a current control loop with a first current path and a second current path, a first current mirror and a second current mirror. The first current mirror in the first current path can generate a similar current as in the second current path and the second current mirror can generate the constant voltage and can control the controlled current source.

This type of current control loop has the advantage that it automatically sets the current flow needed to maintain the constant voltage. The fact that the second current mirror controls the controlled current source results in a control of the current source dependent on the value of the measuring resistor because the current through the current paths is a function of the value of the measuring resistor due to the constant voltage; this is advantageous for providing a signal for the value of the measuring resistor.

Furthermore, the first current mirror can have a first diode and a first amplifier, whereby the first amplifier is controlled by a cathode potential of the first diode. The second current mirror can have a second diode and a second amplifier, whereby the second amplifier is controlled by a cathode potential of the second diode.

This example embodiment provides a simple current control loop having a symmetric configuration, which can be realized with different semiconductor technologies such as bipolar technology or CMOS technology. In this case, it should be regarded advantageous that the realization of the current control loop can be integrated into both a bipolar process and a CMOS process.

The first diode can be realized as the first field-effect transistor, the first amplifier as the second field-effect transistor, the second diode as the third MOS field-effect transistor, and the third amplifier as the fourth MOS field-effect transistor, whereby the first field-effect transistor and the second field-effect transistor are of a first conductivity type and the third MOS field-effect transistor and the fourth MOS field-effect transistor of a second conductivity type.

This type of current control loop is distinguished by a low power requirement.

In another example embodiment, the first and the second field-effect transistor can be the same and the third MOS field-effect transistor and the fourth MOS field-effect transistor can have different channel lengths and/or channel widths.

The particular advantage of the different channel lengths and/or channel widths is that the constant measuring voltage between the two current paths can be easily influenced by these parameters. In MOS field-effect transistors through which identical currents flow, different gate-source voltages occur at different channel length/channel width ratios. This effect permits the generation of a constant potential difference between the two current paths as measuring voltage.

The first diode can be realized as the first bipolar transistor, the first amplifier as the second bipolar transistor, the second diode as the third bipolar transistor, and the third amplifier as the fourth bipolar transistor, whereby the first bipolar transistor and the second bipolar transistor are of a first conductivity type and the third bipolar transistor and the fourth bipolar transistor of a second conductivity type.

The first and the second bipolar transistor can be the same and the third bipolar transistor and the fourth bipolar transistor can have different base-emitter areas.

This example embodiment also leads to a potential difference between both current paths, which can be set as a function of the transistor geometry. Thus, similar advantages arise as in the analog realization with use of MOS field-effect transistors.

In a further example embodiment, a current limiting circuit can be provided that limits the current by the current control loop to a predetermined maximum value.

This example embodiment is used in order not to allow the current through the circuit to increase unnecessarily also in a short circuit between the supply potentials.

Furthermore, the circuit together with a transponder can be placed in a common housing, which also accommodates a capacitor of a receiving resonant circuit of the transponder.

Via such a common accommodation, the capacitor in particular, which is arranged on a board outside the transponder in the conventional art, can be integrated into the housing. As a result, for example, a receiving coil can be connected directly to the pins of the housing. If the receiving coil is dimensioned so that, together with the capacitor integrated into the housing, the resonance occurs at a defined frequency, for example, at f=125 kHz, optimal voltage ratios at the transponder can be expected. The external resonance capacitor on the application card required in the conventional art is unnecessary. Within the scope of another example embodiment, a capacitor integrated into the transponder housing can also be used in conjunction with an external capacitor to adjust the resonance input circuit. This permits the customized use of coils having different inductances, in different applications. This example embodiment therefore ensures the greatest possible flexibility in the connection of the receiving coils. This can be achieved primarily because the integrated capacitor can be manufactured with a +/−5% accuracy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
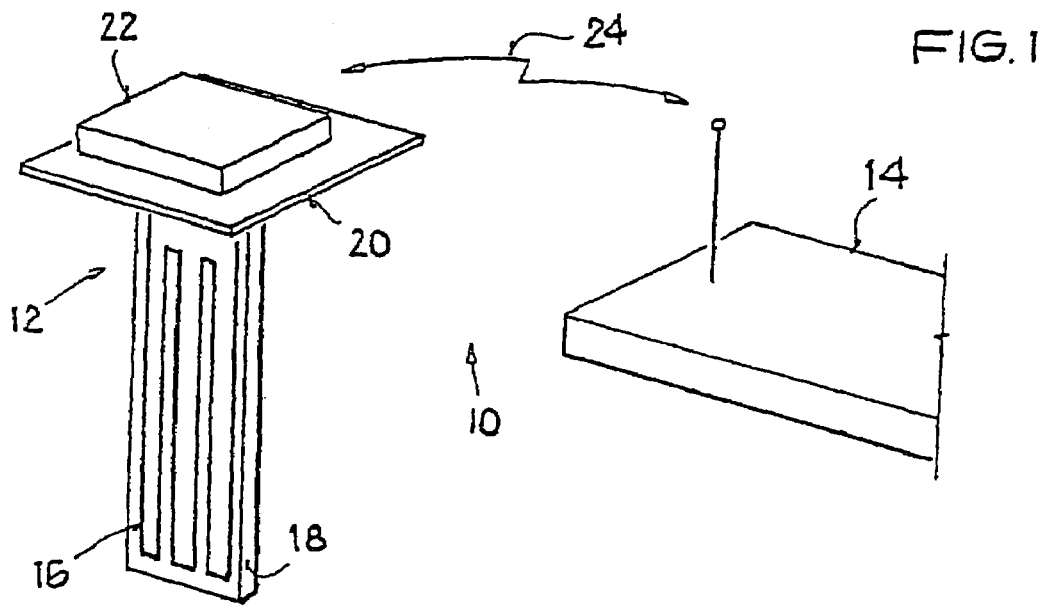
FIG. 1 illustrates an example embodiment according to the present invention, including an operating and evaluation circuit, and a reader.

FIG. 1 shows a complete system 10 of an insect sensor 12 and a reader 14. The insect sensor 12 has a measuring resistor 16, which, for example, is printed on a paper strip 18 impregnated with insect bait. The measuring resistor is attached to a card 20, which also carries an operating and evaluation circuit 22 of the insect sensor 12. The reader 14 stimulates detection of the measuring resistor value by the operating and evaluation circuit 22 via a transponder field connection 24 and shows the results, for example, to a user.

Figure 2:
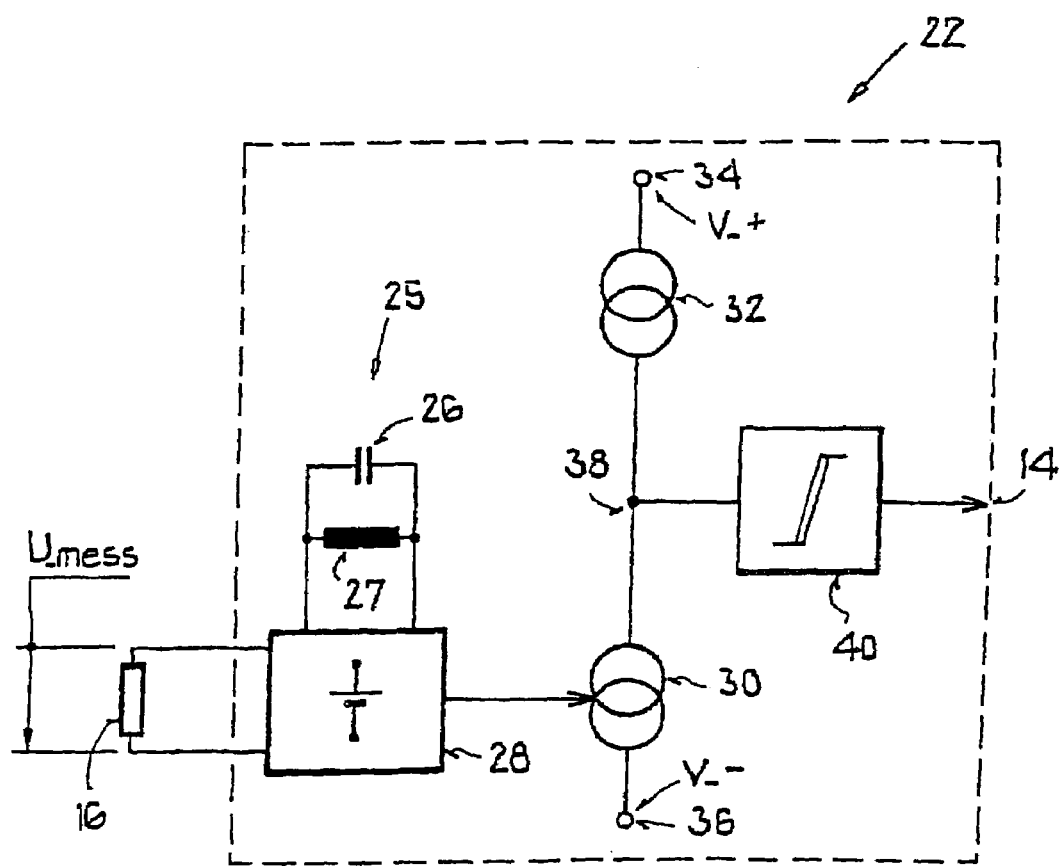
FIG. 2 is a schematic illustration according to an example embodiment of the present invention.

FIG. 2 shows an example embodiment of an operating and evaluation circuit 22 having a constant voltage source 28 that can be stimulated via an input resonant circuit 25 from a capacitor 26 and an inductor 27. The input resonant circuit exchanges signals with the reader 14 via the transponder field connection 24 of FIG. 1. The constant voltage source 28, after stimulation via the transponder field connection 24, applies a constant voltage U_mess to the measuring resistor 16 and thereby generates a current flow through the measuring resistor 16. The circuit 22 derives a voltage signal U_K from the current flow and compares this with a threshold.

For the comparison with the threshold, in an example embodiment, circuit 22 has a first current source 30, which is controlled by the constant voltage source 28 and generates a current that is dependent on the current flow through the measuring resistor 16. A second current source 32 is in series with the controlled first current source 30 between a first supply potential V_+ at terminal 34 and a second supply potential V_− at terminal 36. Between both the first and second current sources 30, 32, there is a node 38, which adds the current flows of the second current source 32 and the first current source 30.

A comparison element 40, for example, a comparator in the form a Schmitt trigger, compares the potential U_K, occurring at node 38 as a function of the current flow, with a predetermined threshold and generates an output signal change when the threshold is passed. The second current source 32, for example, continuously provides a current flow to node 38. The controlled first current source 30, at a high value for the measuring resistor 16, draws a small current from node 38 and, at a low value of the measuring resistor 16, draws a large current from node 38. As long as only the small current is drawn, the potential U_K at node 38 is pulled in the direction of the positive supply potential V_+. If the current drawn from node 38 in contrast increases, the potential U_K at node 38 is pulled in the direction of the lower supply potential V_−. The comparator 40, for example, is adjusted so that the threshold falls between the top and bottom supply potential. Passing of the threshold is communicated to the reader 14 via the transponder field connection 24 and there, for example, displayed or stored for later display.

Thus, FIGS. 1 and 2 together show the operating and evaluation circuit 22 of the insect-sensor 12, which has the measuring resistor 16 dependent on insect infestation, whereby the circuit 22 during stimulation via the transponder generates a current flow through the measuring resistor 16 and detects a change in the measuring resistor 16 as a change in voltage and compares this with a predetermined threshold. A constant voltage source 22 that can be stimulated by the transponder is thus connected to the measuring resistor 16 so that a constant voltage U_mess drops across resistor 16.

Figure 3:
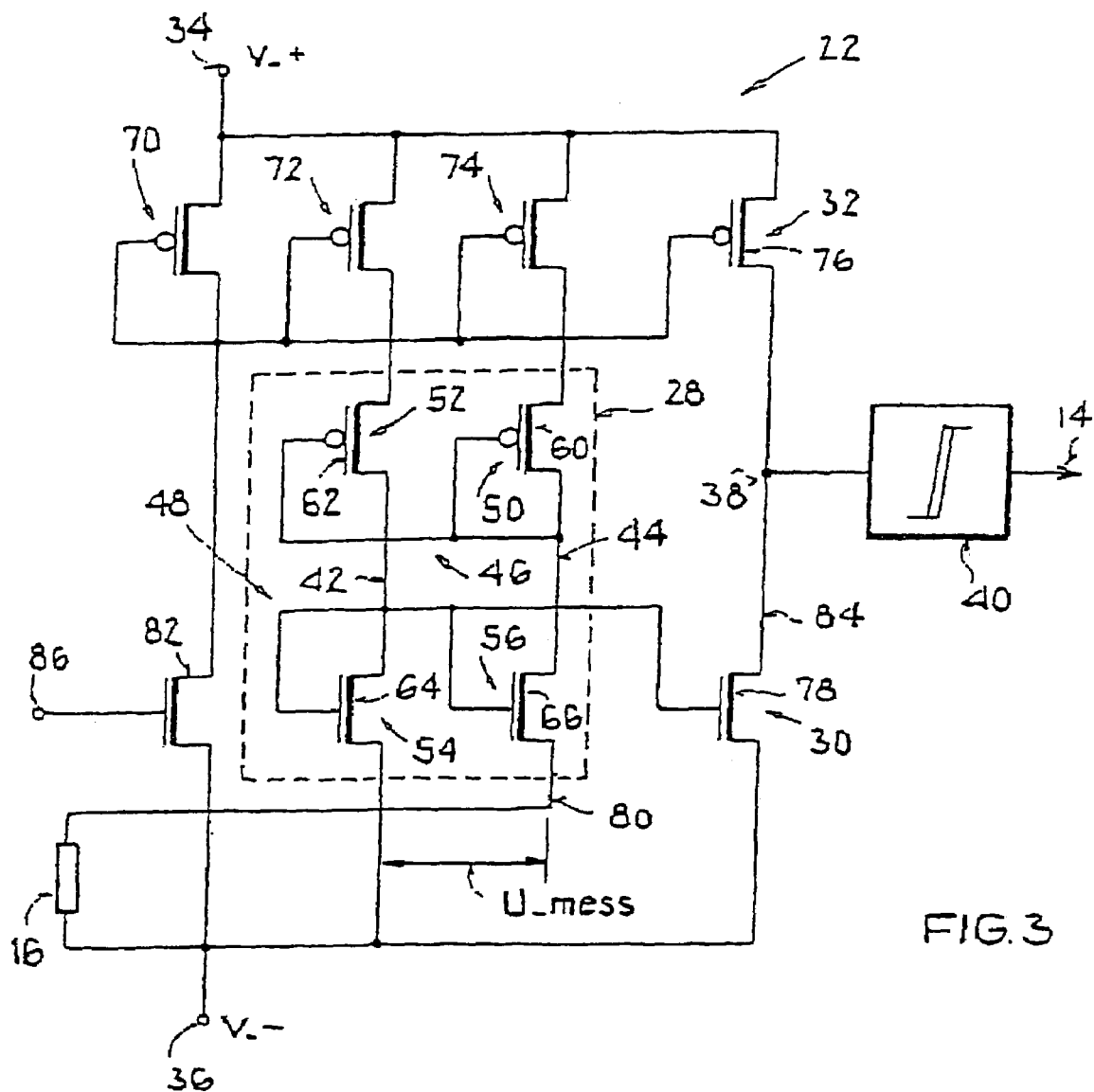
FIG. 3 is a schematic illustration according to an example embodiment of the present invention including MOS field-effect transistors.

FIG. 3 shows a detailed circuit example of the circuit 22 including the example embodiment of the constant voltage source 28, supply potential terminals 34, 36, the first current source 30, the second current source 32, and the node 38. The constant voltage source 28 can have a current control loop with a first current path 42 and a second current path 44, a first current mirror 46 and a second current mirror 48. The first current mirror 46 in the first current path 42 can generate a similar current as in the second current path 44, and the second current mirror 48 can generate the constant voltage U_mess and can control the controlled current source 30.

The first current mirror 46 has a first diode 50 and a first amplifier 52, whereby the first amplifier 52 is controlled by the cathode potential of the first diode 50. Similarly, the second current mirror 48 has a second diode 54 and a second amplifier 56, whereby the second amplifier 56 is controlled by the cathode potential of the second diode 54.

The first diode 50 can be a first field-effect transistor 60, the first amplifier 52 can be a second field-effect transistor 62, the second diode 54 can be a third MOS field-effect transistor 64, and the second amplifier 56 can be a fourth MOS field-effect transistor 66. The first field-effect transistor 60 and the second field-effect transistor 62 can have a first conductivity type, and the third MOS field-effect transistor 64 and the fourth MOS field-effect transistor 66 can be a second conductivity type. In the example embodiment according to FIG. 3, the transistors 60, 62 can be PMOS transistors and the transistors 64, 66 can be NMOS transistors. In very general terms, a circle at the gate terminal of an FET in this application is a PMOS-FET, whereas an NMOS-FET is shown without such a circle at the gate.

The transistors 60, 62, 64, and 66 form a closed control loop with an initial loop gain greater than 1. As a result, the current in both current paths 42, 44 increases up to an equilibrium value, at which the loop gain is reduced by the voltage via the measuring resistor 16 to the value of 1.

The first current mirror 46 ensures particularly similar current intensities in both current paths 42, 44. In this case, the first 60 and the second field-effect transistor 62 are preferably the same. The third MOS field-effect transistor 64 and the fourth MOS field-effect transistor 66, on the contrary, are different insofar as they have different channel lengths and/or channel widths. Because similar currents flow through them, due to the different channel lengths and/or channel widths different voltages occur in both transistors 64, 66 between gate and source and thereby between both current paths 42, 44 of the current control loop. This potential difference U_mess generated at the same currents at different channel dimensions is the one that occurs at the measuring resistor 16. The current control loop establishes a current, which allows the difference of the gate/source voltages of the transistors 64 and 66 to drop at the measuring resistor 16, in each of the current paths 42, 44.

To prevent an undesired increase in current at low values for the measuring resistor 16 or a short circuit to ground, a current limiting circuit of transistors 70, 72, 74 can limit the current through the current control loop to a predetermined maximum value.

The other current source 32, which supplies a current to node 38, can also be a transistor 76. This also applies to the controlled current source 30, which draws current from node 38 and can be a transistor 78.

In summary, the function of circuit 22 of FIG. 3 can be described as follows. A relatively small gate/source voltage difference of transistors 64 and 66 as a measuring voltage U_mess, for example, U_mess=20 mV, is generated via supply potential terminals 34, 36 by the input resonant circuit 25 of FIG. 2. At the trip point of the measuring resistor 16, therefore, at a value of the measuring resistor 16 of 100 kΩ, this generates a current of I=200 nA. At a constant measuring voltage U_mess, this current is determined solely by the resistance value of the paper strip, therefore, of measuring resistor 16. If the external measuring resistor 16, located between terminals 36 and 80, now reaches a value of R=100 kΩ, a current of I_S=200 nA in each case flows in both paths 42, 44 of the current control loop. In order not to the let the current increase unnecessarily with a short circuit in measuring resistor 16, it is limited by current-limiting transistors 72 and 74 to maximum values, for example, to I_max=400 nA for each. Therefore, the total current in the complete circuit 22 cannot exceed a predetermined maximum value.

For evaluation, a high or low potential, which depends on the value of the resistor 16, is generated from the current by the measuring resistor 16. Dimensioning of transistors 82, 70, and 76 achieves that transistor 76 as the second current source 32 supplies a constant current of 200 nA.

The current, generated in the current control loop and dependent on the value of the measuring resistor 16, is mirrored from the second current mirror via transistor 78 as a controllable current source 20 in the output path 84 to node 38. If the value of the measuring resistor 16 is greater than 100 kΩ, then a current I<20 mV/R=200 nA flows and the potential at node 38 is pulled through the second current source 32 toward V_+. If, on the other hand, the value of the measuring resistor 16 is less than 100 kΩ, the current, supplied by the first current source 30, becomes greater than 200 nA and the potential at node 38 is pulled toward V_−. The following comparison element 40, or a Schmitt trigger, then prepares this signal for further digital processing.

A threshold of a resistor can be successfully detected hereby without generating a trigger level directly by a current flowing through it, as was the case, e.g., in the conventional art. Here, a voltage drop at the measuring resistor of U_mess=20 mV is sufficient to generate thereby a digital high-low signal. The start of a measurement can be launched via terminal 86.

Figure 4:
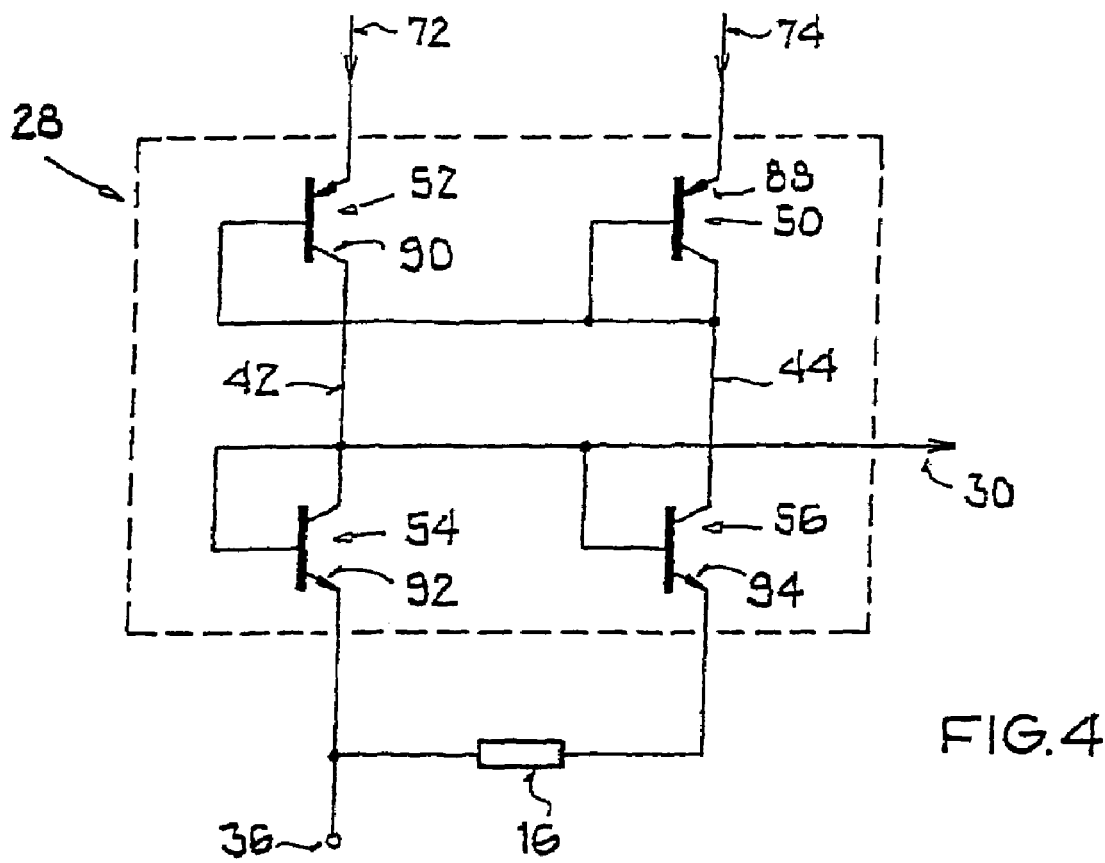
FIG. 4 is a schematic illustration of a current control loop of bipolar transistors.

FIG. 4 shows an alternative realization of the constant voltage source 28, which operates with bipolar transistors 88, 90, 92, and 94. As an alternative to the realization, shown in FIG. 3, with field-effect transistors 62, 64, 66, and 68, the first diode 50 can be realized as the first bipolar transistor 88, the first amplifier 52 as the second bipolar transistor 90, the second diode 54 as the third bipolar transistor 92, and the third amplifier 56 as the fourth bipolar transistor 94, whereby the first bipolar transistor 88 and the second bipolar transistor 90 are of a first conductivity type (e.g., pnp) and the third bipolar transistor 92 and the fourth bipolar transistor 94 of a second conductivity type (e.g., npn).

Within the scope of such an embodiment of the constant voltage source 28 with bipolar transistors 88, 90, 92, and 94, the constant voltage U_mess is achieved across the measuring resistor 16 in that the third bipolar transistor 92 and the fourth bipolar transistor 94 have different base-emitter areas, whereby the first 88 and the second bipolar transistor 90 are the same, which again ensures the same current intensities in both current paths 42, 44.

Further embodiments of the invention relate to the connection of a receiving coil/inductor 27 of an input resonant circuit 25 in FIG. 2 to the transponder. As mentioned above, in the conventional art, a resonance capacitor must be provided on the card 20 of the sensor 12 of FIG. 1, to provide adequate voltage at the transponder housing. In contrast, it is proposed to accommodate the circuit together with a transponder in a common housing, in which a capacitor 26 of a receiving resonant circuit 25 of the transponder is also accommodated.

Figure 5:
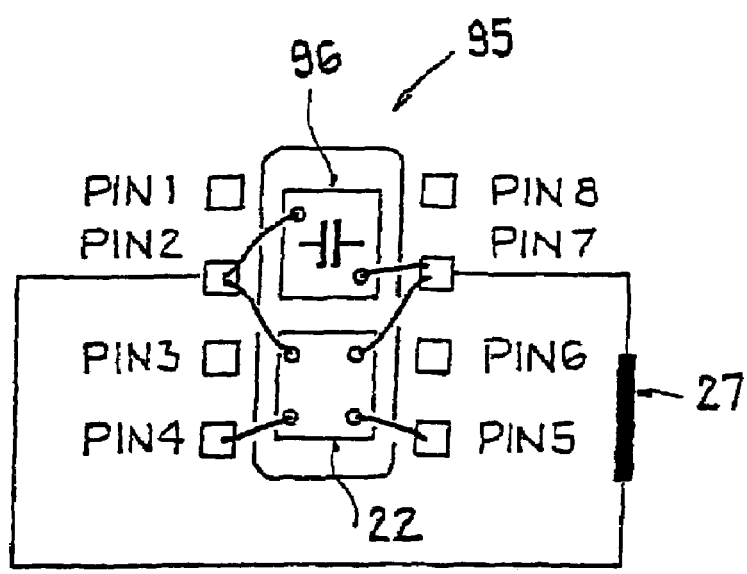
FIG. 5 shows an example of a transponder housing.

FIG. 5 shows schematically an improved transponder housing 95 as a housing for circuit 22, in which a resonance capacitor 96 (C−340 pF+−5%) is integrated and to whose pin 2 and pin 7 a receiving coil 27 can be connected directly. A variety of options arise for using this transponder housing 95.

The bonding shown in FIG. 5 makes it possible to connect a receiving coil 27 directly to pins 2 and 7. If the coil 27, together with the capacitor integrated in the housing 95, is dimensioned so that the resonance drop occurs at a frequency of f=125 kHz, optimal voltage ratios at the transponder can be expected. The external resonance capacitor on card 20 of sensor 12, as present in the conventional art, becomes superfluous.

With a bonding variant such that the capacitor integrated into the housing 95 is routed to pins 1 and 8, an external capacitor for adjusting the resonance input circuit can be used—with the use of a coil with dimensions different from those given above. This allows a flexible utilization of different inductors for customer-specific adjustment of sensors 12.

There is the option as a third variant to retain the pin 2/7 bonding and to balance variations in the coil production by external trimmer capacitors. The high flexibility is achieved primarily also because the integrated capacitor can be manufactured with a +−5% accuracy.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit for an insect sensor, the operating and evaluation circuit comprising:
   a resistor that is dependent on insect infestation; and
   and a transponder-stimulated constant voltage source being connected to the resistor so that a constant voltage drops across the resistor,
   wherein the circuit, upon stimulation via a transponder, generates a current flow through the resistor and detects a change in the resistor as a change in voltage and compares the change with a predetermined threshold; and the circuit further comprising a first current source, which is controlled by the constant voltage source and generates a current dependent on the current flow through the resistor.

2. The circuit according to claim 1, further comprising a second current source, which is in series with the first current source between a first supply potential and a second supply potential and a node, which adds current flows of the second current source and the first current source.

3. The circuit according to claim 2, further comprising a comparison element, which compares a potential at the node as a function of the current flows with the predetermined threshold and generates an output signal change when the threshold is passed.

4. The circuit according to claim 1, wherein the constant voltage source has a current control loop having a first current path and a second current path, a first current mirror and a second current mirror, and wherein the first current mirror in the first current path generates a similar current as in the second current path, and the second current mirror generates the constant voltage and controls the first current source.

5. The circuit according to claim 4, wherein the first current mirror has a first diode and a first amplifier, the first amplifier being controlled by a cathode potential of the first diode, and wherein the second current mirror has a second diode and a second amplifier, the second amplifier being controlled by a cathode potential of the second diode.

6. The circuit according to claim 5, wherein the first diode is a first field-effect transistor, the first amplifier is a second field-effect transistor, the second diode is a third MOS-field-effect transistor, and the third amplifier is a fourth MOS-field-effect transistor.

7. The circuit according to claim 6, wherein the first and second field-effect transistors are substantially the same, and wherein the third MOS field-effect transistor and the fourth MOS field-effect transistor have different channel lengths and/or channel widths.

8. The circuit according to claim 5, wherein the first diode is a first bipolar transistor, the first amplifier is a second bipolar transistor, the second diode is a third bipolar transistor, and the third amplifier is a fourth bipolar transistor.

9. The circuit according to claim 8, wherein the first and second bipolar transistor are substantially the same, and wherein the third bipolar transistor and the fourth bipolar transistor have different base-emitter areas.

10. The circuit according to claim 1, wherein a current limiting circuit, which limits the current by a current control loop to a predetermined maximum value.

11. The circuit according to claim 1, wherein the circuit and the transponder have a common housing, which also accommodates a capacitor of a receiving resonant circuit of the transponder.

12. The circuit according to claim 6, wherein the first field-effect transistor and the second field-effect transistor have a first conductivity type and the third MOS field-effect transistor and the fourth MOS field-effect transistor have a second conductivity type.

13. The circuit according to claim 8, wherein the first bipolar transistor and the second bipolar transistor have a first conductivity type, and the third bipolar transistor and the fourth bipolar transistor have a second conductivity type.

* * * * *